United States Patent [19]

Nauroth et al.

[11] 4,308,074
[45] Dec. 29, 1981

[54] PRECIPITATED SILICIC ACID, METHOD AND COMPOSITIONS CONTAINING SAME

[75] Inventors: Peter Nauroth, Wesseling; Heinz Esch, Wesseling-Urfeld; Robert Kuhlmann, Erftstadt; Rudolf Bode, Bad Orb; Arthur Reisert, Kahl; Harald Bühler, Hanau; Günter Türk, Hanau, all of Fed. Rep. of Germany

[73] Assignee: Deutsche Gold- und Silber-Scheideanstalt vormals Roessler, Frankfurt am Main, Fed. Rep. of Germany

[21] Appl. No.: 241,195

[22] Filed: Jan. 23, 1981

Related U.S. Application Data

[60] Division of Ser. No. 62,397, Jul. 31, 1979, Pat. No. 4,273,589, which is a continuation of Ser. No. 810,441, Jun. 27, 1977, abandoned.

[30] Foreign Application Priority Data

Jun. 28, 1976 [DE] Fed. Rep. of Germany ....... 2628957

[51] Int. Cl.$^3$ .............................................. C09C 1/30
[52] U.S. Cl. ................................ 106/309; 106/288 B; 106/308 Q; 260/37 SB
[58] Field of Search ...................... 106/288 B, 308 Q, , 106/309; 260/37 R, 37 SB

[56] References Cited

U.S. PATENT DOCUMENTS 3,132,961  5/1964  Pierpoint ......................... 106/308 Q
3,649,588  3/1972  Kennedy-Skipton ............ 106/308 Q
3,677,784  7/1972  Nitzsche et al. ................. 106/308 Q Primary Examiner—Jacqueline V. Howard
Attorney, Agent, or Firm—Beveridge, DeGrandi & Kline

[57] ABSTRACT

Finely divided precipitated silicic acid is obtained by the method of the invention.

Compositions containing the finely divided precipitated silicic acid as a filler distributed in an elastomer such as an organopolysiloxane are disclosed.

2 Claims, No Drawings

PRECIPITATED SILICIC ACID, METHOD AND COMPOSITIONS CONTAINING SAME

This is a division of copending application Ser. No. 062,397 filed July 31, 1979, now U.S. Pat. No. 4,273,589 which in turn is a continuation of application Ser. No. 810,441 filed June 27, 1977, now abandoned, both of which applications are relied on herein.

The present invention relates to precipitated silicic acid, the hydrophobic precipitated silicic acid obtained therefrom, method of making the latter, and compositions containing the silicic acid as a reinforcing filler in masses which may be hardenable into elastomers. The cured elastomer compositions also form a part of this invention.

Fillers are solid substances mostly of inorganic origin and of different compositions. Usually in finely divided form, the filler particles may be fine-grained to coarse-grained and of variable shape. They may be added to numerous chemical and industrial products in order to improve certain characteristics.

A known filler is the silicon dioxide, such as is sold under the mark Aerosil, produced in a pyrogenous way. Because of the expensive production process of the pyrogenously obtained silicon dioxide, it is desirable to use in its place a so-called precipitated silicic acid of equal value in many ways and produced in a wet chemical manner.

It is an object of the invention to provide a precipitated silicic acid which is characterized by the following physical and chemical properties:

| | | |
|---|---|---|
| BET surface according to DIN 66 131 | m²/g | 150 + 30 |
| Average size of the primary particles from EM pictures | nm | 15–22 |
| Loss after drying acc. to DIN 55 921 after 2 hours at 105° C. | % | 2.5–3.5 |
| Loss at red heat (related to the sub- acc. to DIN 55 921 dried for 2 hours at 105° C.) | % | 3 + 0.5 |
| pH value (in 5% aqueous methanol dispersion acc. to DIN 53 200) | | 3.5–5.5 |
| Conductivity (in 4% aqueous methanol dispersion) | μS | <500 |
| tamped density of the unaerated substance as in DIN 53 194 | g/l | 60 ± 20 |
| SO₃ content (related to the substance dried for 2 hours at 105° C.) | % | <0.3 |
| Na₂O content (related to the substance dried for 2 hours at 105° C.) | % | <0.3 |

In a preferred embodiment of the precipitated silicic acid, the conductivity in 4% aqueous dispersion may range from 50 to 300 μs. The SO₃ content in a preferred embodiment may range from 0.03 to 0.2%. Likewise, the Na₂O content in a preferred embodiment of the precipitated silicic acid of the invention may range from 0.03 to 0.2%.

A further object of the invention is to provide hydrophobic precipitated silicic acid which is obtained by conversion of the above mentioned precipitated silicic acid of the invention and which is characterized by the following physical and chemical properties:

| | | |
|---|---|---|
| BET surface according to DIN 66 131 | m²/g | 110 + 30 |
| Average size of the primary particles from EM pictures | nm | 15–22 |
| Loss after drying acc. to DIN 55 921 after 2 hours at 105° C. | % | <2.5 |
| Loss at red heat (related to the substance acc. to DIN 55 921 dried for 2 hours at 105° C.) | % | 5.5 ± 1.5 |
| pH value (in 5% aqueous methanol dispersion acc. to DIN 53 200) | | 7 ± 1 |
| Conductivity (in 4% aqueous methanol dispersion) | μS | <600 |
| tamped density of the unaerated substance acc. DIN 53 194 | g/l | 50 ± 20 |
| water wettability | | <0.05 |
| carbon content | % | 2.5 ± 0.6 |
| water absorption at 30° C. & 30% RM | % | 1.2 ± 0.4 |
| at 30° C. & 70% RM | % | 1.5 ± 0.5 |
| DBP adsorption | % | 260 ± 30 |

In a preferred embodiment of the hydrophobic precipitated silicic acid of the invention, the loss at drying may range from 2.5 to 0.0%. The conductivity of the hydrophobic precipitated silicic acid of the invention may range from 50 to 300 μs. The water wettability may range from 0 to 0.05.

A process for the production of the hydrophobic precipitated silicic acid from the above mentioned precipitated silicic acid of the invention is carried out by employing the precipitated silicic acid of the invention and reacting it in a mixing apparatus with a hydrophobic agent in a ratio of 10:0.5 to 10:3. The mixing or agitation may be continued after completion of the addition of the hydrophobic agent. The product obtained thereby is tempered for 60 to 180, preferably 70 to 130 minutes at a temperature of 200° C. to 400° C.

Any suitable mixing apparatus may be used for purposes of the invention. For example, all known mixers as described in Ullmanns Encyclopedia of Industrial Chemistry, Vol. 1, page 713 ff, 3rd Edition, publishers Urban and Schwarzenberg, may be used.

As hydrophobic agents, any organic compound which is reactable with the solid, highly dispersed silicon dioxide of the invention may be used. Many of these compounds have been used hitherto for such a reaction or conversion of precipitated silicic acid into hydrophobic precipitated silicic acid.

Preferred are compounds of the general formula:

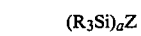

$(R_3Si)_aZ$ whereby R signifies the same or different monovalent hydrocarbon groups, which may be suitable and/or polymeric;

a is 1 or 2;

Z is halogen, hydrogen or a radical of the formula —OH, —OR, —NRX, —ONR₂, —SR, —OOCR, —O—, —N(X)— or —S—;

in which R always has the same meaning as stated above;

and

X is a hydrogen or has the same meaning as R.

Examples of such organosilicon compounds are hexamethyldisilazane, trimethylsilane, trimethylchlorosilane, trimethylethoxysilane, triorganosilylmercaptanes, such as trimethylsilylmercaptan; triorganosilylacylates, such as vinyldimethylacetoxysilane; triorganosilylamines, such as trimethylsilylisopropylamine, trimethylsilylethylamine, dimethylphenylsilylpropylamine and vinyldimethylsilylbutylamine; triorganosilylaminoxy compounds, such as diethylaminoxytrimethylsilane and diethylaminoxydimethylphenylsilane; furthermore hexamethyldisiloxamine, 1,3-divinyltetramethyldisiloxane, 1,3-diphenyltetramethyldisiloxane and 1,3-diphenylhexamethyldisilazane.

Further examples of organosilicon compounds which may be reacted with the solid, highly dispersed precipitated silicic acid within the scope of the invention are dimethyldichlorosilane, dimethyldiethoxysilane, dimethylethoxysilane, dimethyldimethoxysilane, diphenyldiethoxysilane, vinylmethyldimethoxysilane and octamethylcyclotetrasiloxane and/or in the terminal units always dimethylpolysiloxanes with 2 to 12 siloxane units per molecule, containing an Si-bound hydroxyl group.

Further examples of organosilicon compounds which may be reacted with the precipitated silicic acid of the invention are silicon oils which consist of linear organopolysiloxanes. The free valencies of the silicon not bound to oxygen may be satisfied by organic groups such as $CH_3$—, $C_6H_5$— or hydrogen. Their viscosity at 20° C. may be between 3 and 1000 cP, between 20 and 500 cP, preferably between 20 and 100 cP.

Mixtures of various organosilicon compounds may be reacted with the precipitated silicic acid of the invention.

The organosilicon compounds which are reacted with the precipitated silicic acid of finest dispersion according to the invention are used preferably in quantities of 5 to 30% by weight, always related to the weight of the precipitated silicic acid that is to be reacted with it.

The term "solid" or all its variations in connection with the precipitated silicic acid as used herein according to the invention, is intended to indicate that the precipitated silicic acid is not available in the form colloidal silica sodations of silicious brines but, apart from adsorbed water, is in a powdery, solid, air dried form before it is possibly brought into contact with water and before it is reacted with the organo-silicon compounds. However, in the description and in the claims, the term "dry" is not to be considered as synonymous with the term "solid".

The use of the hydrophobic silicic acid of the invention is a reinforcing filler in masses that may be hardened into elastomers; that is, incorporated into compositions capable of forming elastomers upon curing, is likewise the object of the invention. Of particular interest are the diorganic polysiloxanes which are useful for many purposes.

According to the invention, the hydrophobic precipitated silicic acid product may be used in hot-vulcanizing diorganic polysiloxane elastomers. Likewise, the product may also be used in organopolysiloxane elastomers hardenable at room temperature, as preferred, for example, in a two-component silicon molding material or in a one-component sealing material for joints.

As diorganopolysiloxanes suitable for purposes of the invention, all diorganopolysiloxanes may be used which had been used or which could be used hitherto as a foundation for hardenable masses or hardening masses which are convertible into elastomers at room temperature (RTV), only slightly elevated temperature (LTV) or a high temperature (HTV.) These may be represented by the general formula

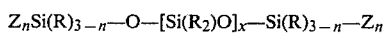

in which

R signifies the same or different monovalent hydrocarbon radicals possibly substituted and/or polymeric;

Z signifies a hydroxyl group, hydrolyzable group and/or hydrolyzable atom or in the case of the presence of masses hardenable at only slightly elevated temperature, Z signifies alkenyl groups;

n is 1, 2 or 3; and x is a whole number of the value of at least 1.

Within or along the siloxane chain in the above mentioned formula, other siloxane units present only in most cases as impurities may also be present as diorganosiloxane units; for example, such units of the formulae $RSiO_{3/2}$, $R_3SiO_{1/2}$ and $SiO_{4/2}$, whereby R always has the same meaning as above. The quantity of these other siloxane units should not exceed 10 mole percent based on the total weight of the siloxane polymer.

Examples of hydrocarbon radicals R are alkyl radicals, such as methyl, ethyl, propyl, butyl, hexyl and octyl radicals; e.g. 1 to 12; alkenyl radicals, such as the vinylallyl, ethylallyl and butadienyl radical; and aryl radicals such as the phenyl and tolyl radical.

Examples of substituted hydrocarbon radicals R, are particularly halogenated hydrocarbon radicals, such as the 3,3,3-trifluoropropyl radical, chlorophenyl and bromotolyl radical; and cyanalkyl radical, such as the beta-cyanoethyl radical.

Examples of polymeric substituted and unsubstituted hydrocarbon radicals R, are polystyryl, polyvinyl acetate, polyacrylate, polymethacrylate and polyacrylnitril radicals bound to silicon via carbon.

At least the overwhelming part of the radicals R consists above all preferably of methyl groups because of the easier accessibility. The optionally present remaining radicals R are especially vinyl and/or phenyl groups.

The substituent Z is most usually a hydrolyzable group. This is especially the case wherein an elastomer forming mass is used which is capable of hardening into elastomers by the addition of water at room temperature and which is storable with the exclusion of water. Examples of such Z groups are amino, amido, aminoxy, oxim, alkoxy, alkoxy-alkoxy-(e.g. $CH_3OCH_2CH_2O$—), alkenyloxy— (e.g. $H_2C=(CH_3)CO$—), acyloxy and phosphate groups. Mainly because of easier accessibility, acyloxy groups, especially acetoxy groups are preferred as Z. However, oxim groups such as groups of the formula $—ON=C(CH_3)(C_2H_5)$, may be used as Z with excellent results being achieved.

Halogen and hydrogen atoms are hydrolyzable atoms and are other examples of Z. Examples of alkenyl groups for Z are especially vinyl groups. The same or different Z groups may be bound to an Si atom.

It is advantageous if, among other things, elastomers forming masses are available which are hardenable to elastomers, and which, without the simultaneous use of solvents, may be processed by simply pouring out or painting. The viscosity of the RTV diorganopolysiloxanes used within the scope of the invention should therefore not exceed 500,000 cP at 25° C., preferably 150,000 cP at 25° C. Correspondingly, the value of x should preferably not exceed 40,000. Mixtures of different diorganopolysiloxanes may be used.

Masses hardenable into elastomers and masses hardening into elastomers with the addition of water at room temperature and storable in a water tight condition, may be prepared containing the finely divided filler of this invention as will be claimed from the following. The finely divided fillers of this invention prepared by reaction of the hydrophobic agents; i.e. organosilicon compounds, with the precipitated silicon dioxide, are mixed with diorganopolysiloxanes and, optionally, other substances at room temperature or at only slightly elevated temperature, also optionally after the addition of one or more wetting agents. This mixing may take place in any known manner; e.g. in mechanical mixing devices. The mixing reaction takes place very quickly and easily, no matter in what sequence the addition of the mixing components is carried out.

Generally, the fillers of the invention are used in quantities of 5 to 50% by weight, preferably 5 to 40% by weight, related to the total weight of the mass hardenable into elastomers. In the case of HTV-organopolysiloxane elastomers, up to 50% by weight may be used.

Whenever Si-bound hydroxyl groups are present as the sole terminal units capable of reaction in the diorganopolysiloxanes containing terminal units capable of reaction, then these diorganopolysiloxanes, in order to harden them in a manner known per se, or in order to convert them through the water contained in the air and possibly with the addition of additional water, into compounds hardening into elastomers, must be converted with cross linking agents and optionally in the presence of a condensation catalyst in a known manner. In the case of HTV diorganopolysiloxane elastomers, organic peroxides, such as bis-2,4-dichlorobenzyl perioxide, benzoyl peroxide, tert. butyl perbenzoate or tert. butyl peracetate, may be used at correspondingly advantageous temperatures.

As hot-vulvanizing organosiloxanes, compounds are selected such that the organic substituent thereof consists of methyl, ethyl, phenyl, trifluoromethylphenyl ($F_3CC_6H_4$) or trimethylsilmethylene radicals [$(CH_3)_3SiCH_2-$], e.g. dimethyl, diethyl, phenylmethyl, phenylethyl, ethylmethyl, trimethylsilmethylenemethyl, trimethylsilmethylenethyl, trifluoromethylphenylmethyl or trifluoromethylphenylethyl siloxanes or copolymerizates of such compounds. Moreover, the polymerizates may contain limited quantities of diphenyl siloxane, bis-trimethylsilmethylene siloxane, bis-trifluoromethylphenylsiloxane units, as well as siloxanes with units of the formula $RSiO_{1.5}$ and $R_3SiO_{0.5}$, whereby R represents one of the above radicals.

Examples of cross-linking agents are especially the silanes of the general formula

$R_{4-t}SiZ'_t$ wherein R has the meaning stated above; $Z_1$ is a hydrolyzable group and/or a hydrolyzable atom and t is 3 or 4. The above mentioned examples for hydrolyzable groups Z and hydrolyzable atoms Z are valid to the full extent also for the hydrolyzable groups $Z'$ and the hydrolyzable atoms $Z'$.

Examples of silanes of the above mentioned formula are methyltriacetoxy silane, isopropyltriacetoxy silane, isopropoxytriacetoxy silane, vinyltriacetoxy silane, methyltrisdiethylaminooxy silane, methyltris(-cyclohexylamine)-silane, methyltris(-diethylphosphato)-silane and methyltris(-methylethylketoximo)-silane.

Polysiloxanes which contain at least 3 Z groups of atoms per molecule whereby the silicon valencies not saturated by $Z'$ groups or atoms are saturated by siloxane oxygen atoms and possibly R groups, may also be used furthermore in place of or mixed with the silanes of the above stated formula. The best known examples for cross-linking agents of the latter type are the polyethylsilicate with an $SiO_2$ content of about 40% by weight, hexaethoxydisiloxane and methyl hydrogen polysiloxanes.

The best known examples for condensation catalysts are tin salts of fatty acids such as dibutyl tin dilaureate, dibutyl tin diacetate and tin-(II)-octoate.

Whenever in the diorganopolysiloxanes containing terminal units capable of reaction as the sole such terminal units capable of reaction, such units as alkenyl groups are present, the hardening or curing to form the elastomers may take place in a known manner with organopolysiloxanes which on the average contain at least 3 Si-bound hydrogen atoms per molecule, such as methyl hydrogen polysiloxane, in the presence of catalysts such as platinum-(IV)-chloroacid, promoting the addition of alkenyl groups to the Si-bound hydrogen. In that case, (LTV) material hardenable at room temperature or only slightly elevated temperature (mostly 50° C. to 80° C.) is then available.

As a further example of the hardening or curing into elastomers, mention is made of the hardening by means of polycyclic organopolysiloxanes in the presence of equilibration catalysts, such as phosphoronitrile chlorides.

Naturally, the compositions hardenable or curable into elastomers may contain besides diorganopolysiloxanes, the precipitated silicic acids according to the invention, cross-linking agents and cross-linking catalysts, and conventional fillers used as optional or traditionally ingredients in materials hardenable or curable into elastomers. Examples for such substances are fillers with a surface below 50 m/²g, such as quartz powder, diatomaceous earth, zirconium silicate, calcium carbonate, untreated pyrogenously produced silicon dioxide, organic resins, such as polyvinylchloride powder, organopolysiloxane resins, fibrous fillers, such as asbestos, glass fibers and organic fibers, pigments, soluble dyes, aromatic principles, corrosion inhibitors, agents stabilizing the material against the influence of water, such as acetic acid anhydride, agents delaying the hardening, such as benzotriazole and plasticizers, such as dimethylpolysiloxanes end-blocked by trimethylsiloxy groups.

The above mentioned combination of physical and chemical property data of the hydrophobic precipitated silicic acid of the invention leads to a highly effective reinforcing filler on the basis of its excellent dispersability. The equilibrium-moisture content clearly reduced as compared to the known precipitated silicic acids brings advantages in case of processing, for example in case of the pressure-less vulcanization, in case of which as compared to the use of the known hydrated precipitated silicic acid, pore-free vulcanizates are obtained. The optimally adjusted pH value leads to noticeably shortened soft rolling times. The low electrolyte content in combination with the low moisture content finally leads to good electric characteristics of the vulcanizates. In cold hardening silicon rubber sealing materials, the hydrophobic precipitated silicic acid of the invention shows advantages for the storability of the uncured materials because of its low water content.

The silicic acids of the invention, as well as the processes for their production will be explained in more detail and described on the basis of the following examples.

EXAMPLE 1

In a reaction vessel 50.0 m³ of water are put up. Slowly, 9.2 m³ of sodium silicate and 0.9 m³ of $H_2SO_4$ are added to the preparation while stirring, whereby an alkaline pH value is maintained in the mixture during the addition. After completing the addition of sodium silicate and H₂SO₄, the pH value of the suspension obtained is in the acid area. The precipitated product is separated from the mother liquor by means of a filter press, is washed, liquefied into a suspension with acidified water and spray dried. The spray dried product is ground substantially by means of a cross mill "type Alphine UP 630". The precipitated silicic acid obtained has the following physical and chemical property data:

| | | |
|---|---|---|
| BET surface acc. to DIN 66 131 | m²/g | 155 |
| Average size of the primary particles from EM pictures | nm | 18-20 |
| Loss after drying acc. to DIN 55 921 after 2 hours at 105° C. | % | 3.0 |
| Loss at red heat (related to the substance dried for 2 hours at 105° C.) acc. to DIN 55 921 | % | 3.3 |
| pH value (in 5% aqueous dispersion) acc. to DIN 53 200 | | 4.4 |
| conductivity (in 4% aqueous dispersion) | µS | 240 |
| Tamped density of the unaerated substance acc. to DIN 53 194 | g/l | 57 |
| SO₃ content (related to the substance dried at 105° C. for 2 hours) | % | 0.22 |
| Na₂O content (related to the substance dried at 105° C. for 2 hours) | % | 0.18 |

EXECUTION OF THE DETERMINATION OF THE ELECTRIC CONDUCTIVITY

A sample of 4.0 g of silicic acid is heated in a 150 ml beaker with 50 ml of fully desalinated water and is boiled for 1 minutes while stirring. Subsequently, the suspension is transferred into a 100 ml measuring flask, is cooled and is filled up to the mark with fully desalinated water. After decanting, the measuring cell of the measuring instrument for the conductivity is first flushed preliminarily with the suspension to be measured and is then filled with the suspension. Alternatively, the measuring cell may be immersed into the suspension. The electric conductivity is read from the measuring device and the temperature of the suspension is determined during the measurement.

CALCULATION

The electric conductivity is given in µS. related to 20° C.

EXAMPLE 2

Production of the hydrophobic precipitated silicic acid of the invention:

In a paddle mixer, 400 g of the precipitated silicic acid of the invention according to example 1 are ground in a cross flow mill—mixed with vigorous intermixing in 40 minutes drop by drop with 44.5 g of Tegiloxane 50. Tegiloxane 50 is the trademark indicating a product of the firm M. Goldschmidt AG, 43 Essen. It is a silicon oil consisting of linear dimethylpolysiloxanes with a viscosity of 50 cP. The conductivity is determined as described in example 1. The mixing is continued for another 80 minutes, the powder which is completely free of lumps is subsequently filled into aluminum cups—height of the layer about 5 cm—and is tempered in the muffle furnace for 90 minutes at 350° C. The product obtained is ground on a disc mill. The chemical and physical property data of the product obtained are: loss at red heat at 1000° C. acc.

| | | |
|---|---|---|
| to DIN 55 921 | % | 6.6 |
| of that, moisture at 105° C. acc. to DIN 55 921 | % | 1.3 |
| pH value acc. to DIN 53 200 | | 7.1 |
| conductivity | µS | 120 |
| BET surface acc. to DIN 66 131 | m²/g | 106 |
| tamped weight acc. to DIN 53 194 | g/l | 54 |
| Water wettability | | <0.05 |
| C - content | % | 2.55 |
| water absorption at 30° C. & 30% M | % | 1.2 |
| at 30° C. & 70% M | % | 1.5 |
| DBP adsorption | % | 261 |

DETERMINATION OF THE WATER WETTABILITY OF HYDROPHOBIC SILICIC ACIDS

In the following method of analysis the determination of the water wettable portions of hydrophobic silicic acids is described.

EXECUTION OF THE DETERMINATION 0.200 g of hydrophobic silicic acid are placed with 50 ml of distilled water in a 250 ml separatory funnel and are agitated for 1 minute with the help of a turbula mixer at the highest number of revolutions.

After letting the wetted parts settle briefly, 45 ml are drawn off into an evaporating dish, are boiled down on a water bath and are then dried at 105° C.

After allowing the wetted parts to settle for a short time, 45 ml, after careful turning around (rotating) (do not shake), are drawn off into an evaporating dish and are then dried at 105° C.

CALCULATION $$\frac{\text{dry residue} \cdot 100}{\text{weighed sample}} = \% \text{ water wettable portions}$$

DETERMINATION OF THE ABSORPTION OF MOISTURE

In the case of the determination of the moisture absorption, the maximal or time dependent moisture absorption of silicic acids is determined in dependence on the temperature and the relative atomspheric humidity.

EXECUTION OF THE DETERMINATION

A silicic acid sample of about 25. g is weighed precisely to 0.1 mg into a dry calibrated weighing bottle and is dried at 105° C. for 2 hours. After cooling the weight is determined on an analytical balance. Subsequently, the open weighing bottle with the sample is kept in a conditioning cabinet at a predetermined temperature and atmospheric moisture. Then either an absorption time diagram for moisture or the maximum absorption of moisture may be determined.

Customarily, the determination is accomplished at
30° C. and 30% of relative atmospheric moisture
30° C. and 70% of relative atmoshperic moisture

CALCULATION $$\frac{\text{g weighing out} \cdot 100}{\text{g weighed sample*}} = \text{absorption of moisture}$$

*dried sample

DETERMINATION OF THE DBP ADSORPTION WITH THE BRABENDER PLASTOGRAPH

The determination of the dibutylphthalate absorption (DBP) is accomplished with the Brabender plastograph and indicates the suction respectively the reception capacity. The reception capacity at the same time depends on the moisture content, the granulation and the weighed sample of the material used. The DBP adsorption is stated relating to anhydrous material.

In order to carry out the determination, reference is made to German Pat. No. 17 67 332, at column 2, lines 30–64.

EXAMPLE 3

In this example, a hydrophobic precipitated silicic acid according to the invention obtained according to the process in example 2, is compounded into various silicon rubber varieties and is checked for its effectiveness as a reinforcing filler or thioxotroping agent in a two-component silicon poured curable mass and in a one-component silicon material for sealing joints (acetate system).

EXPERIMENTS IN A TWO-COMPONENT SILICON POURED CURABLE MASS (COLD VULCANIZING)

In the subsequent recipes the silicic acid was mixed in by means of a dissolver:
  45 parts dimethylpolysiloxane with hydroxyl terminal groups viscosity 100 cSt
  45 parts dimethylpolysiloxane with hydroxyl terminal groups viscosity 18 000 cSt
  10 parts silicic acid (10%)
  2 parts cross-linked orthosilicic acid ester
  42.5 parts dimethylpolysiloxane with hydroxyl terminal groups viscosity 1000 cSt
  42.5 parts dimethylpolysiloxane with hydroxyl terminal groups viscosity 18 000 cSt
  15.0 parts silicic acid (15%)
  2 parts cross-linked orthosilicic acid ester After the addition of a hardening agent, the flow and hardening behavior were observed.

In the case of cross-linked samples stored for 3 days

|     | tensil strength | acc. to DIN 53 504 |
|-----|-----------------|--------------------|
|     | extension at break | acc. to DIN 53 504 |
|     | tear propagation strength | acc. to DIN 53 515 |
| and | Shore-A-hardness | acc. to DIN 53 505 | were determined.

EXPERIMENTS IN A ONE-COMPONENT SILICONE SEALING MASS FOR JOINTS (COLD VULCANIZING)

The following recipe with acetate hardener was made the base of these experiments.
  67.8 parts by weight of dimethylpolysiloxane with hydroxyl groups viscosity 50,000 cSt
  27.8 parts by weight of dimethylpolysiloxane with trimethylsiloxy terminal groups viscosity 1000 cSt
  4.4 parts by weight of methyltriacetoxysilane
  17.6 or 24.9 parts by weight of precipitated silicic acid
  0.005 parts by weight of dibutyl tin diacetate The working in of the silicic acid was accomplished after the addition of the cross-linking agent in an evacuable planetary mixer.

The sealing mass for joints which was still in the form of a paste or its vulcanizate hardened in the air for 7 days, and after that was subjected to the following test:
(a) extrudability acc. to ASTM 24 51-67 T
(b) stability acc. to the "Hütchen" method (cup, capsule)
(c) module at 100% stretch acc. to DIN No. 53 504
(d) tensil strength acc. to DIN No. 53 504
(e) extension at break acc. to Din No. 53 504
(f) tear propagation strength acc. to DIN No. 53 515
(g) Shore-A-hardness acc. to DIN No. 53 505

TABLE I

Examination of Hydrophobic Precipitated Silicic Acid in a Two-Component Silicone Rubber

| Precipitated silicic acid | % | Hardening behavior | flow behavior (with hardener) | tensil strength kg/cm² | extension at break % | tear propagation strength kg/cm | Shore-A hardness |
|---|---|---|---|---|---|---|---|
| without | | cross-linking after ½ hour | proceeding automatically | 2.5 | 75 | 0.6 | 18 |
| precipitated silicic acid acc. to Example 2 | 10 | cross-linked after ½ hr | proceeding automatically | 7.2 | 125 | 1.2 | 31 |
| | 15 | cross-linked after ½ hr | just still proceeding automatically | 11.3 | 145 | 1.5 | 39 |

TABLE II

Examination of Hydrophobic Precipitated Silicic Acid in a One-Component Silicone Sealing Mass

| Precipitated silicic acid acc. to Ex. 2 | Coating | Curing behavior | Stability (Hutchen) | Extrudability g/min | Module 100 kg/cm² | Tensile strength kg/cm² | Extension at break % | Tear propagation kg/cm | Shore-A-hardness |
|---|---|---|---|---|---|---|---|---|---|
| 15% | | does not cure completely | very moderate | od:8.9 1d:8.4 3d:7.7 | 2.5 | 28 | 850 | 4.4 | 14 |

TABLE II-continued

Examination of Hydrophobic Precipitated Silicic Acid in a One-Component Silicone Sealing Mass

| Precipitated silicic acid acc. to Ex. 2 | Coating | Curing behavior | Stability (Hutchen) | Extrudability g/min | Module 100 kg/cm$^2$ | Tensile strength kg/cm$^2$ | Extension at break % | Tear propagation kg/cm | Shore-A-hardness |
|---|---|---|---|---|---|---|---|---|---|
| 20% | | does not cure completely | good | 7d:7.1 1.5 | 4.3 | 45 | 1100 | 20.0 | 21 |

The determination of the stability according to the "Hütchen method" has not been standarized to be sure but is customary in practice as a quick method. For its execution, a small quantity is pressed from a cartridge or the tube onto a solid support (base) and is drawn out into a point. From the shape of the point and from its stability, statements concerning the stability of the one-component system may be made.

RESULTS OF THE EXAMINATIONS

Examination in a Two-Component Silicone Decanting Mass (Table I)

In the case of an addition of 15% silicic acid, the mixtures without cross-linking agent take an automatic course. Even after the addition of cross-linking agent, the sample has no thioxotropic effect and shows a satisfactory automatic course of the pouring material (mass).

The hydrophobic precipitated silicic acid according to the invention in this case behaves advantageously. It brings about a clear improvement of the mechanical strength in the system.

Without fillers, there will be a product which can easily be crumbled and which barely possesses any rubber-like characteristics.

Examination of a One-Component Silicone Sealing Mass for Joints (Table II)

According to the present status of the prior art, the use of hydrophobic precipitated silicic acids is not possible for mechanical reinforcement because of their high moisture contents (in the case of 30° C. and 70% relative atmospheric moisture, this amounts to about 4%), since in the case of degrees of flow of at least 20 parts, the water content inserted into the mixture is so high that the mixture will cure in the tube even after a short period of time. Only the silicic acid 4 according to example 2, because of its low moisture content (at 30° C. and 70% relative atmospheric moisture, the latter amounts to about 1.5%) offers the required storage stability and thus the prerequisite for its use in practice.

Samples of known hydrophobic precipitated silicic acids may be worked into the mass to be sure in concentrations of 15%, but they lead at the latest after one day of storage time, to an undesirable hardening in the closed tube because of their high moisture content.

A mixture produced with 15% of hydrophobic precipitated silicic acid according to the invention does not cross-link in the tube and produces after curing in the air, considerable mechanical values.

A mixture cross-linked with 20% hydrophobic precipitated silicic acid according to the invention shows a good stability, no curing in the tube and excellent rubber technical characteristics.

Examination of the Hydrophobic Precipitated Silicic Acids 1 according to example 2 in Hot Vulcanizing Silicone Rubber.

According to the following recipe, vulcanizates are produced and tested. The results may be taken from Table III.

100 parts by weight dimethylpolysiloxane with trimethylsiloxy-terminal groups and a content of vinyl groups as well
50 parts by weight of silicic acid
1.5 parts by weight bis-2,4-dichlorobenzoylperoxide (50% as paste in silicone oil)
vulcanization: 7 min. at 130° C.
Secondary vulcanization 6 hrs. at 200° C.

TABLE III

Examination of the Hydrophobic Precipitated Silicic Acid According to the Invention in Hot vulcanizing Silicone Rubber Degree of filling of precipitated silicic acid: 50 parts.

| Shore-A-hardness | (1) | | 52 |
|---|---|---|---|
| tensil strength | (2) | kg/cm$^2$ | 85 |
| stretch at break | (3) | % | 410 |
| effectiveness | | kg/cm$^2$ | 35 |
| tear propagation strength | (4) | kg/cm | 12 |

(1) acc. to DIN 53 505
(2) acc. to DIN 53 504
(3) acc. to DIN 53 504
(4) acc. to DIN 53 515

A high level of value for the mechanical data such as tensil strength, extension at break and tear propagation strength with the lowest possible value for the Shore-A-hardness is desirable for the hot hardening silicone rubber. From the data of Table III, one can recognize that these combinations of characteristics have been fulfilled in a superior manner for the precipitated silicic acid according to the invention.

The relatively low Shore-A-hardness of vulcanizates filled with precipitated silicic acid according to the invention permits a further increase of the share of filler substance (up to Shore-A-hardness values of 60) which, in turn, is followed by a positive influencing of the mechanical data.

The following example illustrates the general method of preparation of the precipitated silicic acid used in the process of this invention.

Water is placed in a suitable reaction vessel. To this water, there is added with agitation a water glass solution to provide from 0.15 to 0.25 parts water glass based on the weight of water. Water glass is an inorganic composition which is well known in the art and any available source of water glass may be used for purposes of the invention. It consists primarily of sodium silicate and the solutions of sodium silicate are usually thick syrupy liquids.

Further, there is added to the water with agitation, from 0.15 to 0.25 parts of $H_2SO_4$ based on the weight of the water. During this addition there is an alkaline pH condition. After addition of the water glass and $H_2SO_4$ the pH of the suspension is in the acid pH range.

The product precipitates out and is separated from the mother liquor by means of a filter press. Thereafter, the filtered product is washed and rinsed with acidified water to form a suspension. The suspension may then be spray dried. The dried product is then ground by any convenient means to produce a finely divided material.

We claim:

1. A process for the production of hydrophobic silicic acid comprising treating precipitated silicic acid having the following properties:

| | | |
|---|---|---|
| BET surface acc. to DIN 66 131 | $m^2/g$ | 150 ± 30 |
| Average size of the primary particles from EM pictures | nm | 15–22 |
| Loss after drying acc. to DIN 55 921 after 2 hours at 105° C. | % | 2.5–3.5 |
| Loss at red heat (related to the substance dried for 2 hours at 105° C.) acc. to DIN 55 921 | % | 3 ± 0.5 |
| pH value (in 5% aqueous dispersion) acc. to DIN 53 200 | | 3.5–5.5 |
| Conductivity (in 4% aqueous dispersion) | us | <500 |
| Tamped density of the unaerated substance acc. to DIN 53 194 | g/l | 60 ± 20 |
| $SO_3$ content (related to the substance dried for 2 hours at 105° C.) | % | <0.3 |
| $Na_2O$ content (related to the substance dried for 2 hours at 105° C.) | % | <0.3 | with a hydrophobic agent in a ratio of 10:0.5 to 10:3 and agitating the precipitated silicic acid with hydrophobic agent, and tempering the product obtained for 60 to 180 minutes at a temperature of 200° C. to 400° C. and thereafter grinding to form a finely divided product.

2. The process as defined in claim 1 wherein the tempering is carried out for a period of 70 to 130 minutes.

* * * * *